United States Patent
R et al.

(10) Patent No.: US 11,960,943 B2
(45) Date of Patent: Apr. 16, 2024

(54) EVENT LOG MANAGEMENT

(71) Applicant: Juniper Networks, Inc., Sunnyvale, CA (US)

(72) Inventors: Jayanthi R, Bangalore (IN); Bhaskar T. Reddy, Bangalore (IN); Chandrasekhar A, Bengaluru (IN)

(73) Assignee: Juniper Networks, Inc., Sunnyvale, CA (US)

( * ) Notice: Subject to any disclaimer, the term of this patent is extended or adjusted under 35 U.S.C. 154(b) by 209 days.

(21) Appl. No.: 17/698,579

(22) Filed: Mar. 18, 2022

(65) Prior Publication Data

US 2023/0195544 A1    Jun. 22, 2023

(30) Foreign Application Priority Data

Dec. 20, 2021   (IN) .............................. 202141059282

(51) Int. Cl.
*G06F 9/54*   (2006.01)
(52) U.S. Cl.
CPC ..................... *G06F 9/542* (2013.01)
(58) Field of Classification Search
CPC .............................. G06F 9/542; G06F 16/1734
See application file for complete search history.

(56) References Cited

U.S. PATENT DOCUMENTS

| | | | |
|---|---|---|---|
| 8,732,307 B1 | 5/2014 | Zhu et al. | |
| 9,984,112 B1* | 5/2018 | Wang | G06F 16/11 |
| 10,210,162 B1* | 2/2019 | Rees | G06F 3/0611 |
| 2020/0341798 A1 | 10/2020 | Duleba | |
| 2022/0035682 A1 | 2/2022 | Casillas et al. | |

FOREIGN PATENT DOCUMENTS

| | | |
|---|---|---|
| KR | 20210056430 A | 5/2021 |
| KR | 20210127822 A | 10/2021 |

OTHER PUBLICATIONS

Extended European Search Report for Application No. EP22171500.6, dated Oct. 4, 2022, 12 pages.

* cited by examiner

*Primary Examiner* — Andy Ho

(74) *Attorney, Agent, or Firm* — Harrity & Harrity, LLP

(57) ABSTRACT

Some implementations described herein relate to a system that is configured to obtain one or more event logs associated with a tenant of the system. The system may be configured to determine, based on the one or more event logs, an event rate associated with the tenant and thereby determine, based on the event rate, a rotation interval. The system may be configured to cause, based on the rotation interval, a data structure to be generated for storing event logs associated with the tenant that are obtained during a time window. The system may be configured to obtain, within the time window, one or more additional event logs associated with the tenant and to cause, based on obtaining the one or more additional event logs within the time window, the one or more additional event logs to be stored in the data structure.

20 Claims, 9 Drawing Sheets

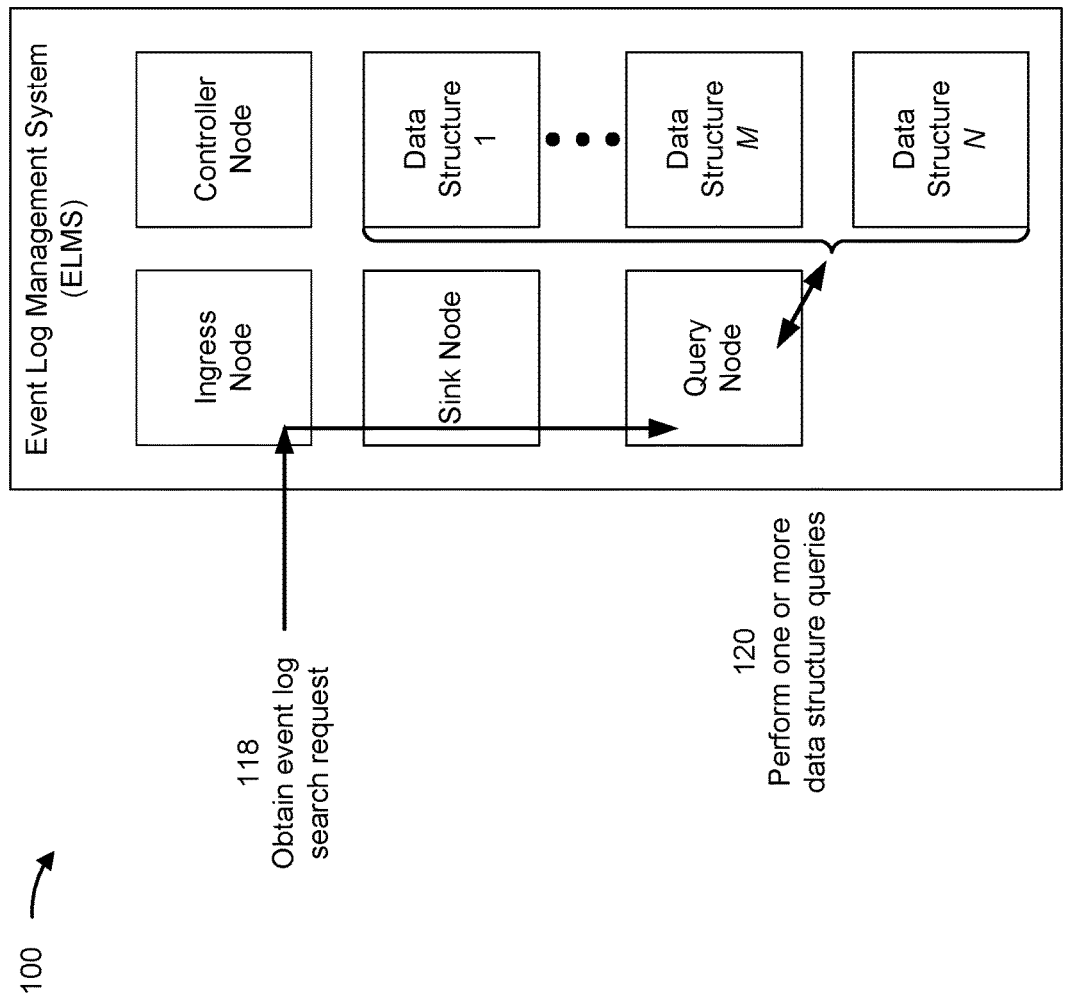

500

510 — Obtain one or more event logs associated with a tenant of the system

520 — Determine, based on the one or more event logs, an event rate associated with the tenant 530 — Determine, based on the event rate, a rotation interval 540 — Cause, based on the rotation interval, a data structure to be generated for storing event logs associated with the tenant that are obtained during a time window 550 — Obtain, within the time window, one or more additional event logs associated with the tenant 560 — Cause, based on obtaining the one or more additional event logs within the time window, the one or more additional event logs to be stored in the data structure

FIG. 5

EVENT LOG MANAGEMENT

CROSS-REFERENCE TO RELATED APPLICATION

This application claims priority to India Patent Application No. 202141059282, entitled "EVENT LOG MANAGEMENT," filed on Dec. 20, 2021, the entire content of which is expressly incorporated herein by reference.

BACKGROUND

Software-as-a-service (SaaS) is a cloud service that hosts applications or services. In some cases, a multi-tenant SaaS environment may provide resources that are to be shared by different tenants (e.g., different groups of subscribers or customers) of the environment.

SUMMARY

Some implementations described herein relate to a system. The system may include one or more memories and one or more processors. The system may be configured to obtain one or more event logs associated with a tenant of the system. The system may be configured to determine, based on the one or more event logs, an event rate associated with the tenant. The system may be configured to determine, based on the event rate, a rotation interval. The system may be configured to cause, based on the rotation interval, a data structure to be generated for storing event logs associated with the tenant that are obtained during a time window. The system may be configured to obtain, within the time window, one or more additional event logs associated with the tenant. The system may be configured to cause, based on obtaining the one or more additional event logs within the time window, the one or more additional event logs to be stored in the data structure.

Some implementations described herein relate to a non-transitory computer-readable medium that stores a set of instructions for a system. The set of instructions, when executed by one or more processors of the system, may cause the system to determine, based on one or more event logs associated with a tenant of the system, an event rate associated with the tenant. The set of instructions, when executed by one or more processors of the system, may cause the system to determine, based on the event rate, a predicted event rate associated with the tenant. The set of instructions, when executed by one or more processors of the system, may cause the system to determine, based on the predicted event rate, a rotation interval. The set of instructions, when executed by one or more processors of the system, may cause the system to cause, based on the rotation interval, a data structure to be generated for storing event logs associated with the tenant that are obtained during a time window. The set of instructions, when executed by one or more processors of the system, may cause the system to obtain, within the time window, one or more additional event logs associated with the tenant. The set of instructions, when executed by one or more processors of the system, may cause the system to cause, based on obtaining the one or more additional event logs within the time window, the one or more additional event logs to be stored in the data structure.

Some implementations described herein relate to a method. The method may include determining, by a system and based on one or more event logs associated with a tenant of the system, an event rate associated with the tenant. The method may include determining, by the system and based on the event rate, a rotation interval. The method may include causing, by the system and based on the rotation interval, a data structure to be generated for storing event logs associated with the tenant that are obtained during a time window. The method may include causing, by the system, one or more additional event logs that are obtained within the time window to be stored in the data structure.

BRIEF DESCRIPTION OF THE DRAWINGS

FIGS. 1A-1E are diagrams of an example implementation described herein.

FIG. 5 is a flowchart of an example process relating to event log management.

DETAILED DESCRIPTION

Figure 1A:
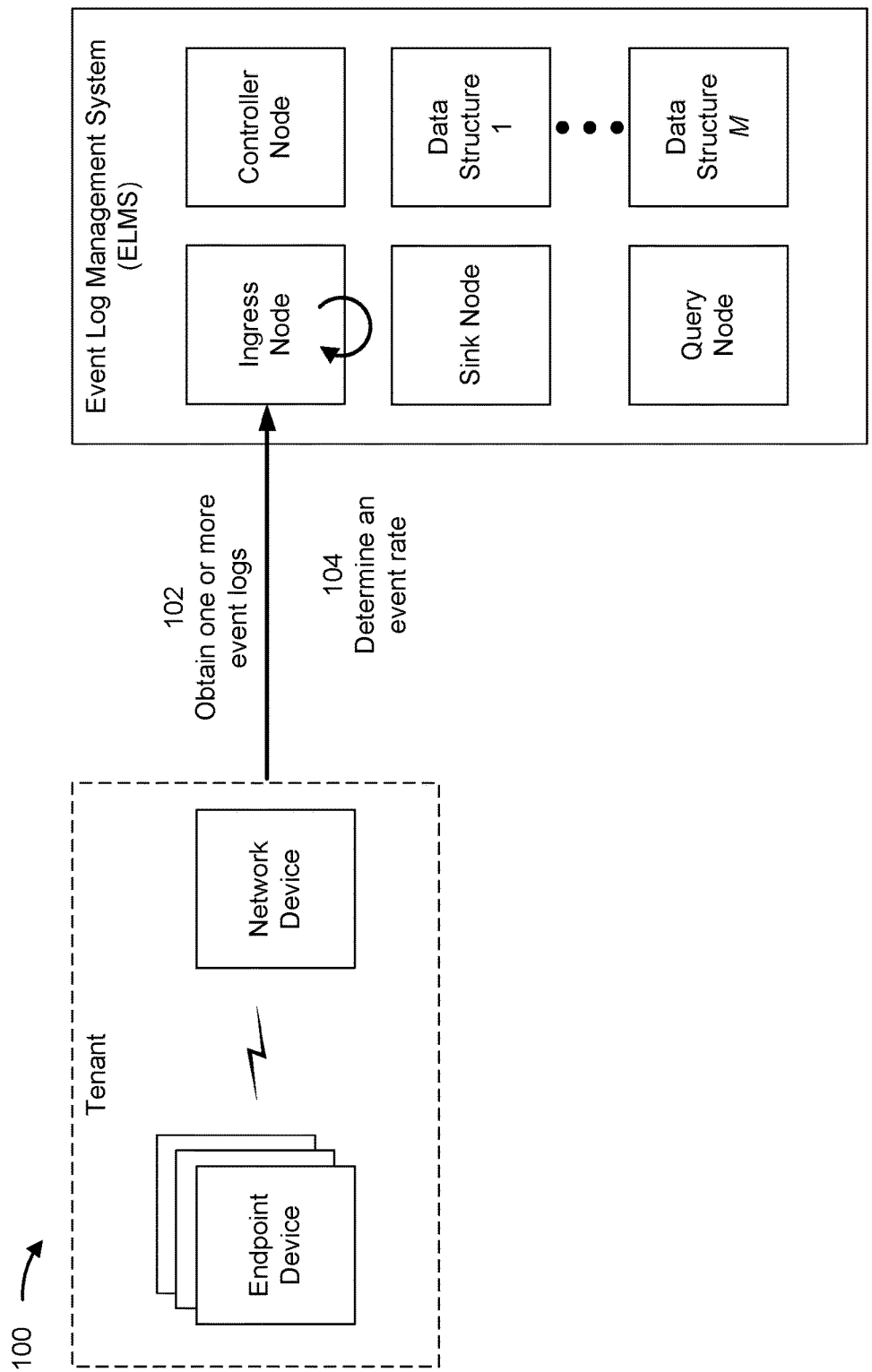

The following detailed description of example implementations refers to the accompanying drawings. The same reference numbers in different drawings may identify the same or similar elements.

A typical SaaS system (e.g., that provides security services) receives event logs from respective devices of tenants of a multi-tenant SaaS environment (e.g., to identify, prevent, and/or mitigate abnormal events, attacks, viruses, worms, or other malicious behavior or events associated with individual tenants). In many cases, each tenant sends event logs to the SaaS system at a different rate. For example, a first tenant may send hundreds of event logs per second, a second tenant may send thousands of event logs per second, a third tenant may send tens of thousands event logs per second, and so on. However, for each tenant, the SaaS system provides a single-sized data structure (e.g., a database) for storage of event logs received during a particular period of time (e.g., 1 hour). This causes issues when a total size of a tenant's event logs received during the particular period of time exceeds a storage size of the data structure. For example, the SaaS system must utilize computing resources (e.g., processing resources, memory resources, communication resources, and/or power resources, among other examples) to generate a new data structure on the fly, purge and/or delete older data structures, and/or perform other actions. This can impact a performance of the SaaS system, such as by causing delays related to performing event log related queries and/or reporting.

Some implementations described herein provide a system that obtains one or more event logs associated with a tenant of the system and determines, based on the one or more event logs, an event rate associated with the tenant. The system determines, based on the event rate, a rotation interval (e.g., an amount of time, such as an hour, a day, or a week, among other examples), and thereby causes a data structure to be generated for storing event logs associated with the tenant that are obtained during a time window (e.g., that has a duration that is equal to the rotation interval). The system obtains, within the time window, one or more additional event logs associated with the tenant and causes, based on obtaining the one or more additional event logs within the time window, the one or more additional event logs to be stored in the data structure.

In this way, some implementations described herein automatically generate a data structure for storing a tenant's event logs based on an event rate of the event logs. This allows for generation and utilization of data structures that fit a tenant's storage needs during a time window. Further, this reduces a likelihood that a total size of a tenant's event logs received during the time window exceeds a storage size of the data structure. Accordingly, this reduces a utilization of computing resources (e.g., processing resources, memory resources, communication resources, and/or power resources, among other examples) that would otherwise be needed to generate a new data structure on the fly, purge and/or delete older data structures, and/or perform other actions. This improves a performance of the system (e.g., as compared to a typical SaaS system), such as by minimizing delays related to performing event log related queries and/or reporting.

Further, in some implementations, the system obtains an event log search request and identifies, based on a search start time and a search end time of the request, one or more additional data structures for storing event logs during respective time windows. Accordingly, the system performs, based on the event log search request, one or more data structure queries on the one or more additional data structures to identify event log search information, and provides the event log search information (e.g., for display on another device).

FIGS. 1A-1E are diagrams of one or more example implementations 100 described herein. Example implementation(s) 100 may include an event log management system (ELMS), a network device, and/or one or more endpoint devices, which are described in more detail below in connection with FIGS. 2-4. The ELMS may be, for example, a multi-tenant cloud hosted event log management SaaS system, and the one or more endpoint devices and the network device may be associated with a tenant of a multi-tenant SaaS environment provided by the ELMS. As shown in FIGS. 1A-1E, the ELMS may include an ingress node, a sink node, a query node, a controller node, and/or a plurality of data structures (shown as data structures 1 through M, where M≥2, in FIG. 1A).

As shown in FIG. 1A, and by reference number 102, the ELMS may obtain one or more event logs (e.g., that are associated with a tenant of the ELMS). For example, the one or more endpoint devices and/or the network device may generate the one or more event logs (e.g., based on operation of the one or more endpoint devices and/or the network device), and may send the one or more event logs to the ELMS (e.g., in near real-time). In some implementations, the ingress node of the ELMS may receive the one or more event logs.

As shown by reference number 104, the ELMS may determine an event rate associated with the tenant. For example, the ELMS (e.g., using the ingress node) may determine, based on the one or more event logs and/or other obtained event logs associated with the tenant, a number of event logs that the ELMS obtained during a particular time period (e.g., the previous 5 minutes). Accordingly, the ELMS may determine the event rate based on the number of event logs and the particular time period (e.g., by dividing the number of event logs by a length of the particular time period).

Figure 1B:
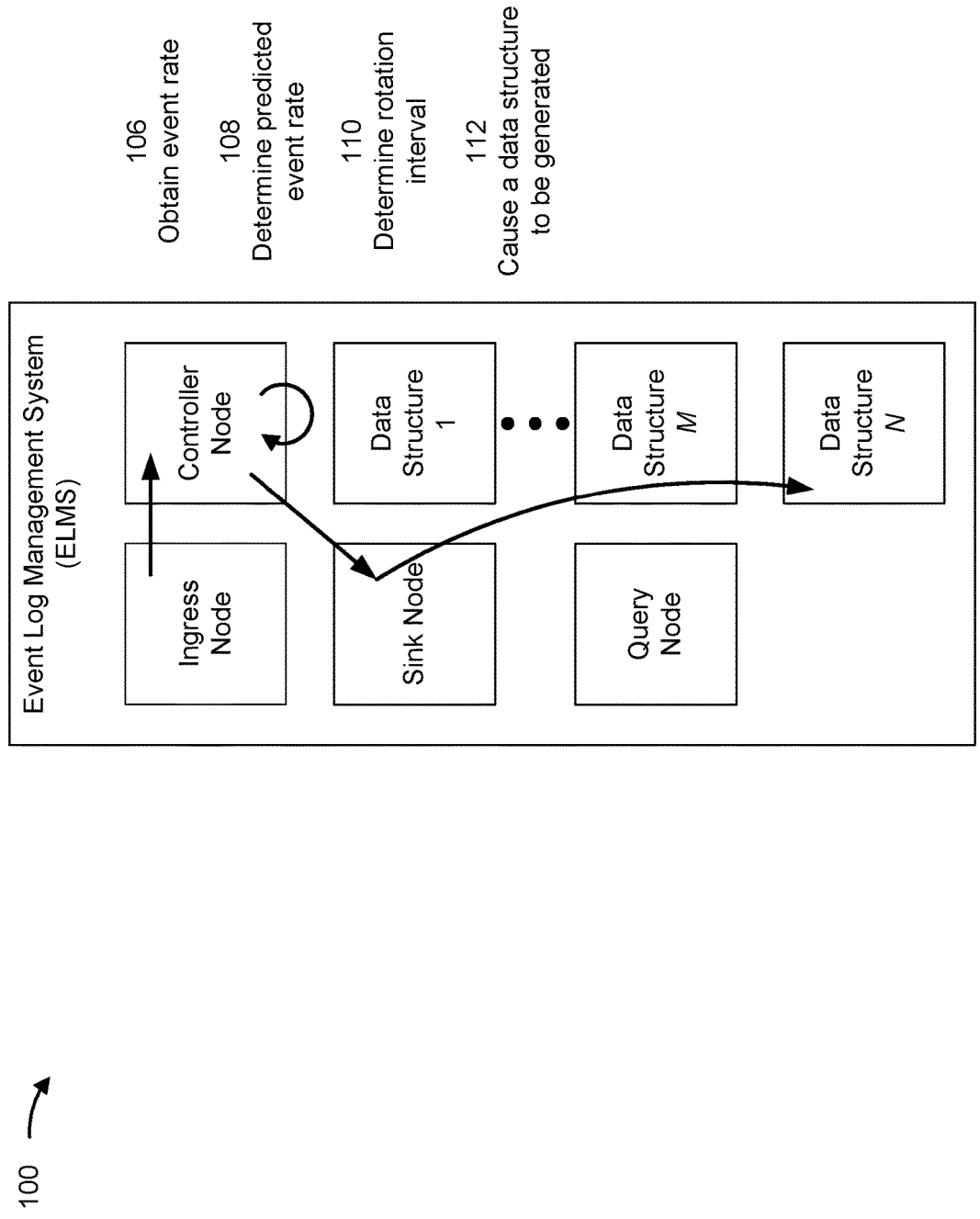

As shown in FIG. 1B, and by reference number 106, the controller node may obtain the event rate associated with the tenant from the ingress node. Accordingly, as shown by reference number 108, the ELMS (e.g., using the controller node) may determine a predicted event rate associated with the tenant. In some implementations, the ELMS (e.g., using the controller node) may process the event rate associated with the tenant (e.g., that was determined by the ELMS) and/or one or more previous event rates associated with the tenant (e.g., that were previously determined by the ELMS) to determine the predicted event rate associated with the tenant. For example, the ELMS (e.g., using the controller node) may utilize a machine learning model, such as a univariate time series forecasting model (e.g., that utilizes two variables—time and event rate), to determine the predicted event rate associated with the tenant based on the event rate associated with the tenant and/or the one or more previous event rates associated with the tenant. The machine learning model may determine the predicted event rate in uniform time intervals (e.g., every five minutes).

As shown by reference number 110, the ELMS (e.g., using the controller node) may determine (e.g., based on the event rate and/or the predicted event rate) a rotation interval (e.g., an amount of time, such as an hour, a day, or a week, among other examples, associated with saving event logs in a single data structure). For example, the ELMS (e.g., using the controller node) may identify a representative capacity of a data structure (e.g., a number of event logs that can be stored by a data structure) and may determine, based on the predicted event rate, a number of event logs to be received during a particular time interval (e.g., an hour, a day, a week, or a month, among other examples). In some implementations, the ELMS (e.g., using the controller node) may determine that the number of event logs to be received during the particular time interval is less than or equal to the representative capacity, and therefore identify the particular time interval as the rotation interval. For example, when the particular time interval is one hour, the ELMS may cause the rotation interval to be one hour. Alternatively, the ELMS (e.g., using the controller node) may determine that the number of event logs to be received during the particular time interval is greater than the representative capacity, and therefore cause the rotation interval to be greater than the particular time interval. For example, when the particular time interval is one day, the ELMS may cause the rotation interval to be one week, or when the particular time interval is one week, the ELMS may cause the rotation interval to be one month, among other examples.

As shown by reference number 112, the ELMS may cause (e.g., based on the rotation interval) a data structure to be generated. For example, the controller node may communicate with the sink node to cause the sink node to create, as shown in FIG. 1B, a data structure N. The data structure may be configured to store event logs associated with the tenant that are obtained during a time window. The time window may start at the time of creation of the data structure and may end when an amount of time equal to the rotation interval has lapsed since the time of creation (e.g., when the start time of the time window is t, the end time of the time window is t+r, where r is the rotation interval). In some implementations, the ELMS (e.g., using the sink node) may cause the data structure to have a name that identifies the tenant, the time window, and/or a category of event logs that are to be stored in the data structure (e.g., security event logs, traffic event logs, and/or other event logs). For example, the data structure may have a name with the following structure: <Tenant Name><Time Window><Event Log Category>. The <Time Window> element may have, for example, the following structure: <Year><Month><Day><Hour>.

Figure 1C:
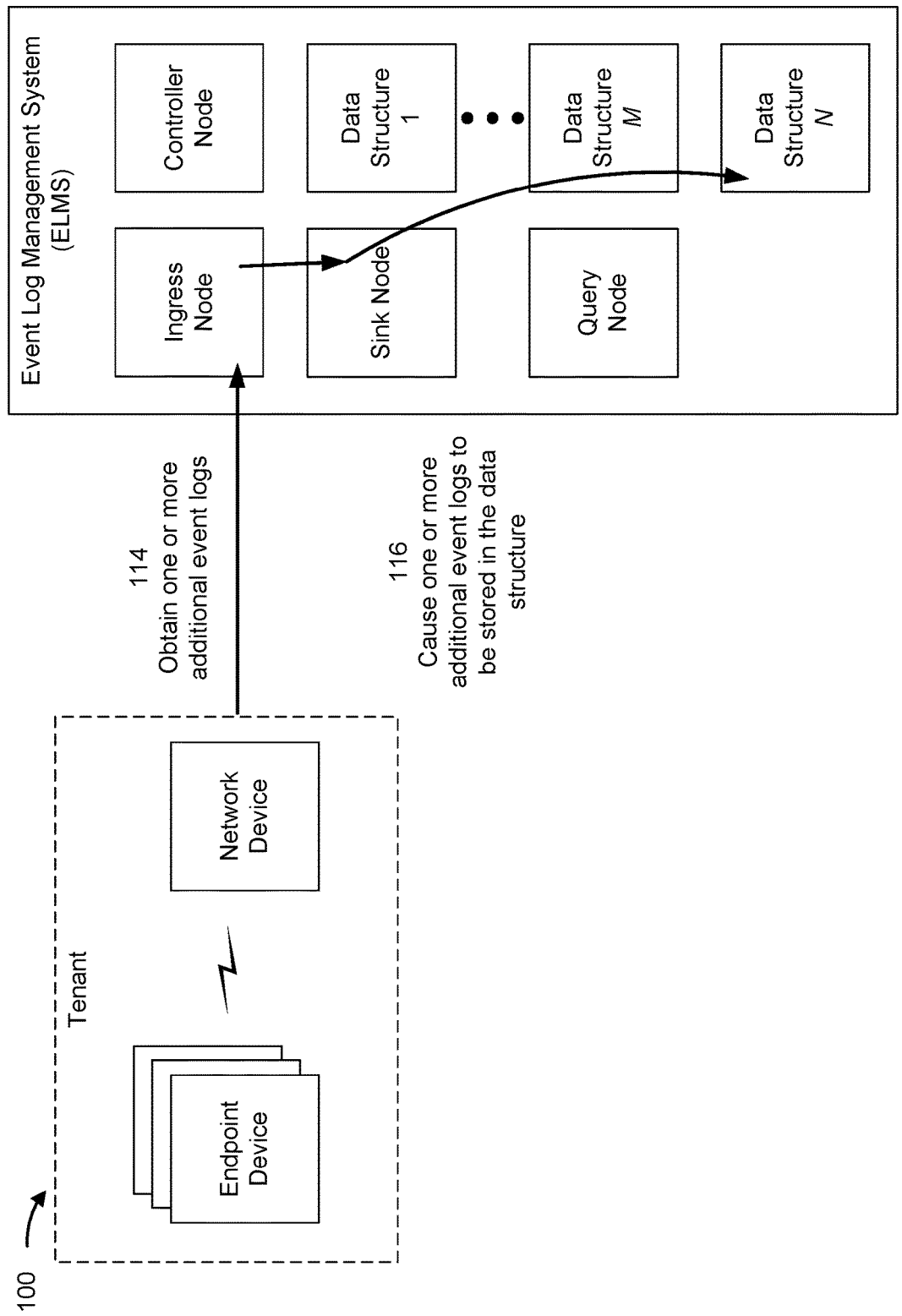

As shown in FIG. 1C, and by reference number 114, the ELMS may obtain one or more additional event logs associated with the tenant of the ELMS. For example, the one or more endpoint devices and/or the network device may generate the one or more additional event logs (e.g., based on operation of the one or more endpoint devices and/or the network device), and may send the one or more additional event logs to the ELMS (e.g., in near real-time). In some implementations, the ingress node of the ELMS may receive the one or more additional event logs.

In some implementations, the ELMS may obtain the one or more additional event logs within the time window (e.g., that is associated with the data structure N generated by the ELMS). Accordingly, as shown by reference number 116, the ELMS may cause the one or more additional event logs to be stored in the data structure (e.g., the data structure N). For example, as shown in FIG. 1C, the ingress node may forward the one or more additional event logs to the sink node, which may determine that the ELMS obtained the one or more additional event logs within the time window (e.g., a time of obtainment o of the one or more additional event logs is within the start time t and end time t+r of the time window, such that t≤o≤t+r). Accordingly, the sink node may store the one or more additional event logs in the data structure N.

As shown in FIG. 1D, and by reference number 118, the ELMS may obtain an event log search request (e.g., for information associated with one or more event logs obtained by the ELMS). For example, a particular endpoint device, of the one or more endpoint devices, may generate an event log search request (e.g., based on input by a user of the particular endpoint device), and may send the event log search request to the ELMS. In some implementations, the ingress node of the ELMS may receive the event log search request and may forward the event log search request to the query node.

As shown by reference number 120, the ELMS may perform one or more data structure queries (e.g., based on the event log search request). For example, the ELMS (e.g., using the query node) may process the event log search request to determine a search start time and a search end time associated with the event log search request (e.g., a span of time associated with the event log search request). The ELMS (e.g., using the query node) may search another data structure (e.g., a binary search tree, such as a balanced binary search tree, or another data structure, that stores information identifying respective start times and time windows of the plurality of data structures) to identify a set of data structures (e.g., one or more data structures), of the plurality of data structures (e.g., data structures 1 through N). Each data structure, of the set of data structures, may have a time window that is at least partially coextensive with the span of time associated with the event log search request. For example, the ELMS may search the other data structure to identify a set of chronologically ordered data structures, of the plurality of data structures, wherein a first data structure of the set of chronologically ordered data structures has a start time that occurs prior to, or at that same time as, the search start time of the event log search request, and wherein a last data structure of the set of chronologically ordered data structures has a start time that occurs prior to, or at the same time as, the search end time of the event log search request and has an end time (e.g., as indicated by a length of time, after the start time of the data structure, of the time window associated with the data structure) that occurs after, or at the same time as, the search end time of the event log search request. That is, a span of time associated with the set of chronologically ordered data structures has a start time that occurs prior to, or at that same time as, the search start time of the event log search request and an end time that occurs after, or at that same time as, the search end time of the event log search request.

Accordingly, the ELMS (e.g., using the query node) may respectively perform, based on the event log search request, one or more data structure queries on the set of data structures. For example, the ELMS (e.g., using the query node) may perform a data structure query on each data structure of the set of chronologically ordered data structures. In this way, the ELMS (e.g., using the query node) may identify log search information (e.g., as a result of the one or more data structure queries) and may provide the log search information. For example, the ELMS may transmit the log search information to the particular endpoint device (e.g., that sent the event log search request to the ELMS), which may cause the particular endpoint device to display the log search information on a display of the particular endpoint device.

Figure 1E:
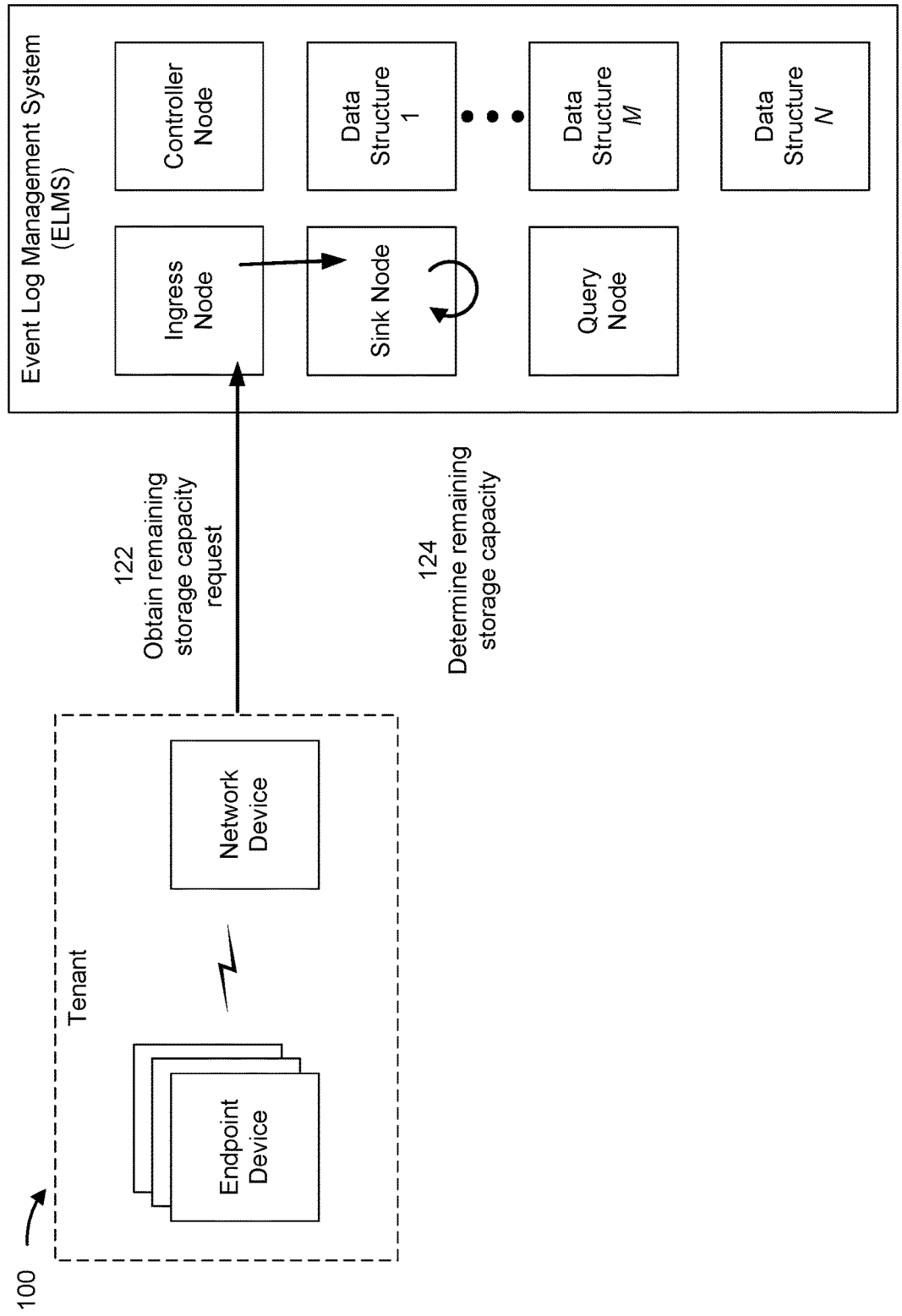

As shown in FIG. 1E, and by reference number 122, the ELMS may obtain a remaining storage capacity request (e.g., a request for information relating to an amount of storage that is available for event logs associated with the tenant). For example, a particular endpoint device, of the one or more endpoint devices, may generate a remaining storage capacity request (e.g., based on input by a user of the particular endpoint device), and may send the remaining storage capacity request to the ELMS. In some implementations, the ingress node of the ELMS may receive the remaining storage capacity request and may forward the remaining storage capacity request to the sink node.

As shown by reference number 124, the ELMS may determine (e.g., based on the remaining storage capacity request) a remaining storage capacity (e.g., an amount of storage that is available for event logs associated with the tenant), such as represented in an amount of time. For example, the ELMS (e.g., using the sink node) may determine, based on the remaining storage capacity request, an amount of available storage (e.g., in megabytes, gigabytes, or terabytes) for the tenant (e.g., based on preconfigured information, such as that indicated by a license agreement between the tenant and an operator of the ELMS) and thereby determine a number of event logs that can be stored in the available storage for the tenant (e.g., by dividing the amount of available storage for the tenant by a representative size of an event log). The ELMS (e.g., using the sink node) may determine, based on the number of event logs that can be stored in the available storage for the tenant and the event rate associated with the tenant, a remaining storage capacity for the tenant represented in an amount of time (e.g., by dividing the number of event logs that can be stored in the available storage for the tenant by the event rate associated with the tenant). Accordingly, the ELMS may provide the remaining storage capacity for the tenant represented in the amount of time. For example, the ELMS may transmit the remaining storage capacity for the tenant represented in the amount of time to the particular endpoint device (e.g., that sent the remaining storage capacity for the tenant request), which may cause the particular endpoint device to display the remaining storage capacity for the tenant represented in the amount of time on a display of the particular endpoint device.

As indicated above, FIGS. 1A-1E are provided merely as one or more examples. Other examples may differ from what is described with regard to FIGS. 1A-1E.

Figure 2:
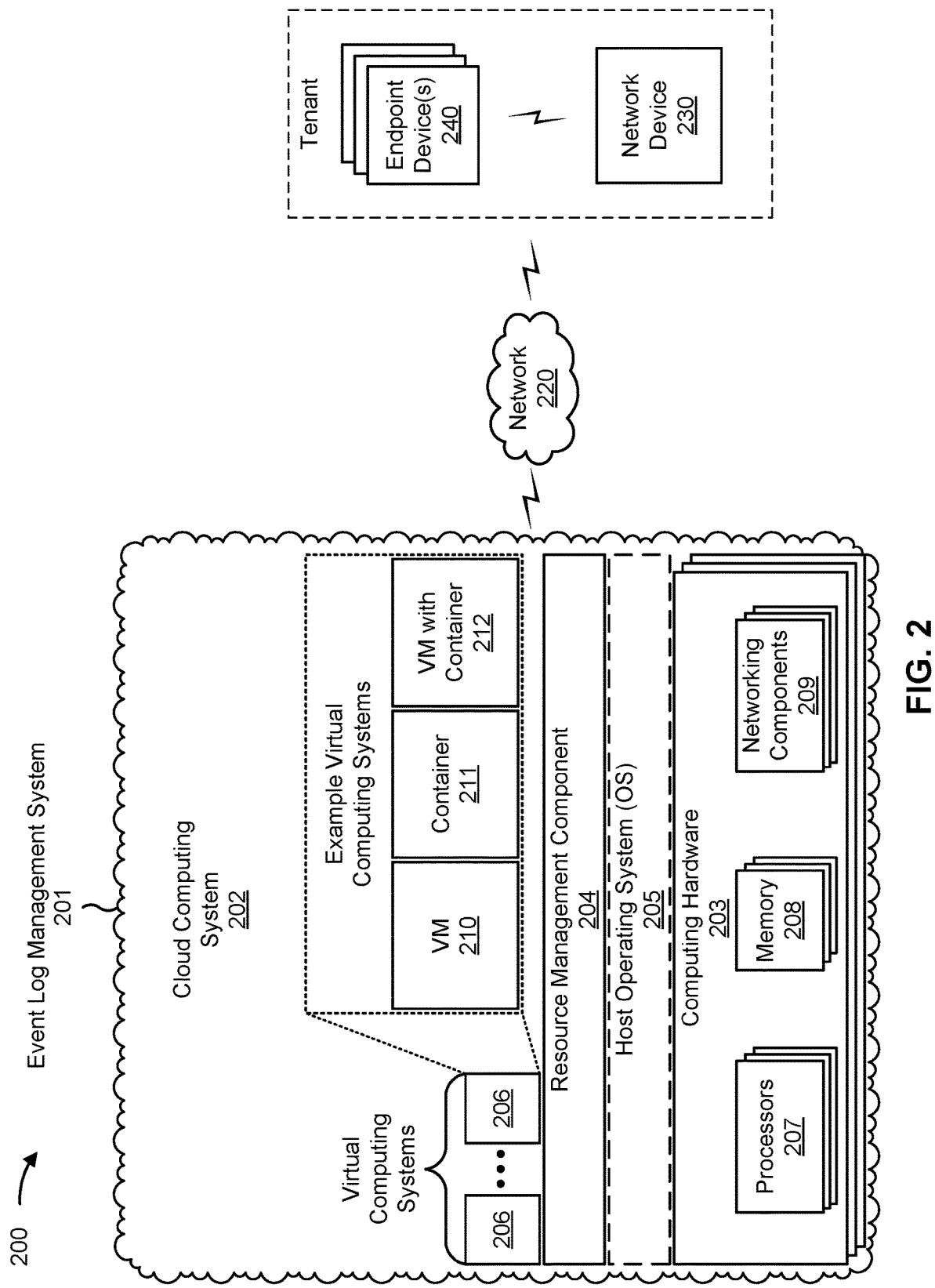
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an event log management system 201, which may include one or more elements of and/or may execute within a cloud computing system 202. The cloud computing system 202 may include one or more elements 203-212, as described in more detail below. As further shown in FIG. 2, environment 200 may include a network 220, a network device 230, and/or one or more endpoint devices 240. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211 (e.g., that comprise one or more threads). In some implementations, the resource management component 204 executes within and/or in coordination with a host operating system 205. In some implementations, the resource management component 204 includes the ingress node, the sink node, the query node, the controller node, and/or the plurality of data structures described herein in relation to FIGS. 1A-1E.

A virtual computing system 206 includes a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the event log management system 201 may include one or more elements 203-212 of the cloud computing system 202, may execute within the cloud computing system 202, and/or may be hosted within the cloud computing system 202, in some implementations, the event log management system 201 may not be cloud-based (e.g., may be implemented outside of a cloud computing system) or may be partially cloud-based. For example, the event log management system 201 may include one or more devices that are not part of the cloud computing system 202, such as device 300 of FIG. 3, which may include a standalone server or another type of computing device. The event log management system 201 may perform one or more operations and/or processes described in more detail elsewhere herein. In some implementations, the event log management system may provide a multi-tenant SaaS environment to one or more tenants (e.g., where a tenant includes a network device 230 and one or more endpoint devices 240).

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

Network device 230 includes one or more devices capable of receiving, processing, storing, routing, and/or providing traffic (e.g., a packet or other information or metadata) in a manner described herein. For example, network device 230 may include a router, such as a label switching router (LSR), a label edge router (LER), an ingress router, an egress router, a provider router (e.g., a provider edge router or a provider core router), a virtual router, or another type of router. Additionally, or alternatively, network device 230 may include a gateway, a switch, a firewall, a hub, a bridge, a reverse proxy, a server (e.g., a proxy server, a cloud server, or a data center server), a load balancer, and/or a similar device. In some implementations, network device 230 may be a physical device implemented within a housing, such as a chassis. In some implementations, network device 230 may be a virtual device implemented by one or more computer devices of a cloud computing environment or a data center. In some implementations, a group of network devices 230 may be a group of data center nodes that are used to route traffic flow through network 220. In some implementations, network device 230 may be associated with a tenant of the multi-tenant SaaS environment provided by the event log management system 201.

Endpoint device 240 includes one or more devices capable of receiving, generating, storing, processing, and/or providing information, such as information described herein. For example, endpoint device 240 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 240 may receive network traffic from and/or may provide network traffic to event log management system 201 and/or network device 230, via network 220. In some implementations, endpoint device 240 may be associated with a tenant of the multi-tenant SaaS environment provided by the event log management system 201.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
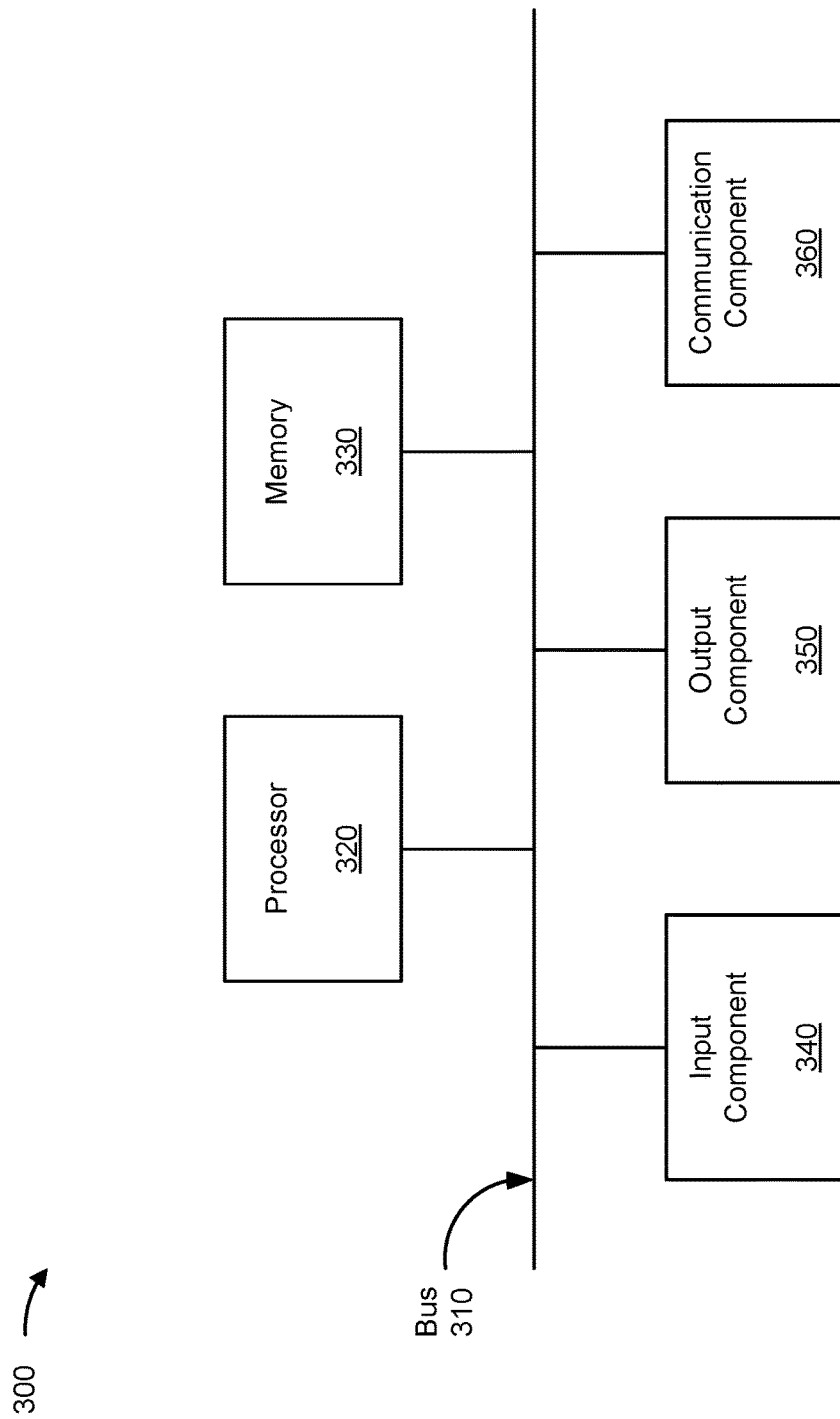
FIGS. 3-4 are diagram of example components of one or more devices of FIG. 2.

FIG. 3 is a diagram of example components of a device 300, which may correspond to event log management system 201, computing hardware 203, network device 230, and/or endpoint device 240. In some implementations, event log management system 201, computing hardware 203, network device 230, and/or endpoint device 240 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
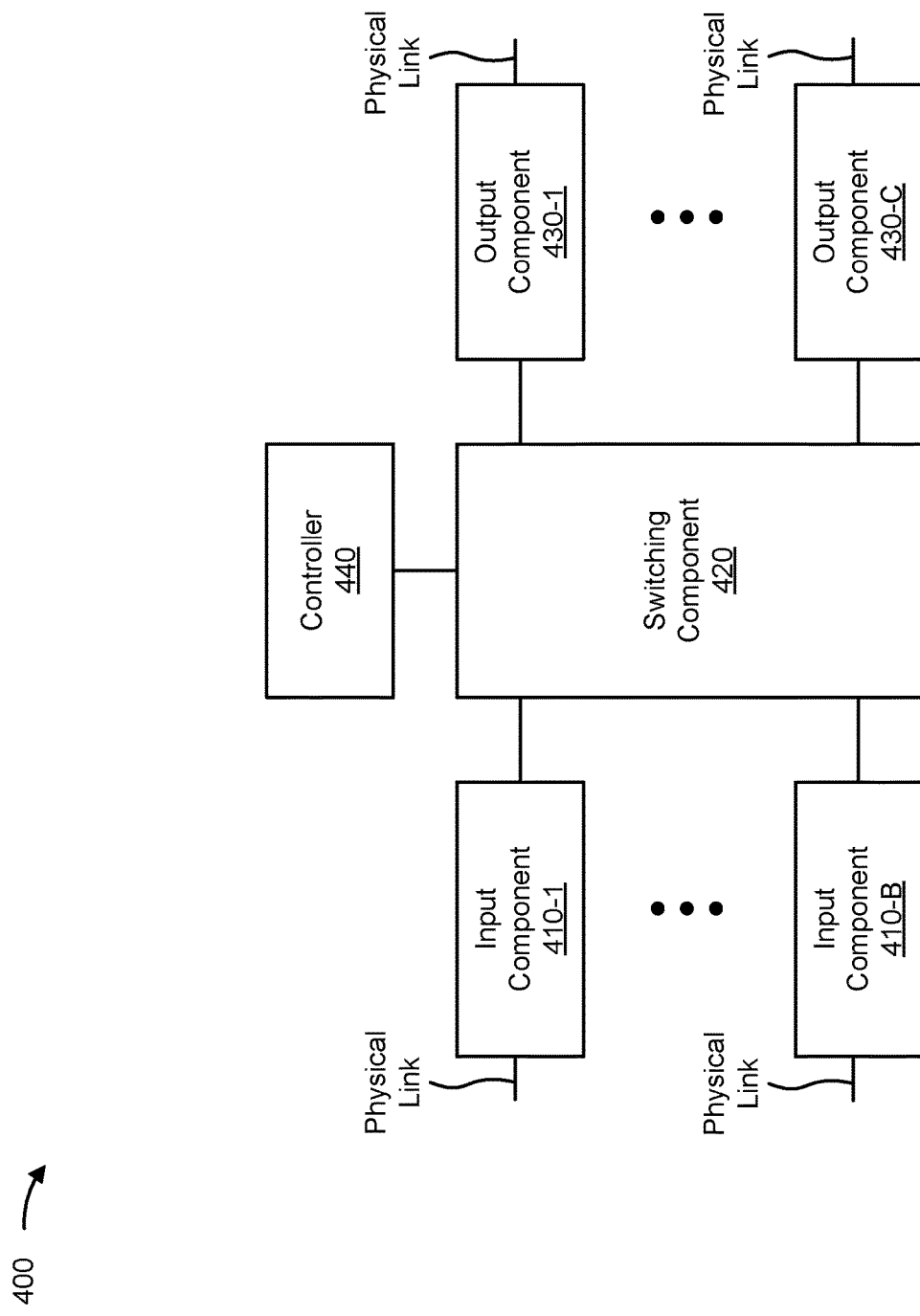

FIG. 4 is a diagram of example components of a device 400. Device 400 may correspond to event log management system 201, computing hardware 203, network device 230, and/or endpoint device 240. In some implementations, event log management system 201, computing hardware 203, network device 230, and/or endpoint device 240 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with event log management. In some implementations, one or more process blocks of FIG. 5 are performed by a system (e.g., event log management system 201). In some implementations, one or more process blocks of FIG. 5 are performed by another device or a group of devices separate from or including the system, such as computing hardware (e.g., computing hardware 203), a network device (e.g., network device 230), and/or an endpoint device (e.g., endpoint device 240). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 5, process 500 may include obtaining one or more event logs associated with a tenant of the system (block 510). For example, the system may obtain one or more event logs associated with a tenant of the system, as described above.

As further shown in FIG. 5, process 500 may include determining, based on the one or more event logs, an event rate associated with the tenant (block 520). For example, the system may determine, based on the one or more event logs, an event rate associated with the tenant, as described above.

As further shown in FIG. 5, process 500 may include determining, based on the event rate, a rotation interval (block 530). For example, the system may determine, based on the event rate, a rotation interval, as described above.

As further shown in FIG. 5, process 500 may include causing, based on the rotation interval, a data structure to be generated for storing event logs associated with the tenant that are obtained during a time window (block 540). For example, the system may cause, based on the rotation interval, a data structure to be generated for storing event logs associated with the tenant that are obtained during a time window, as described above.

As further shown in FIG. 5, process 500 may include obtaining, within the time window, one or more additional event logs associated with the tenant (block 550). For example, the system may obtain, within the time window, one or more additional event logs associated with the tenant, as described above.

As further shown in FIG. 5, process 500 may include causing, based on obtaining the one or more additional event logs within the time window, the one or more additional event logs to be stored in the data structure (block 560). For example, the system may cause, based on obtaining the one or more additional event logs within the time window, the one or more additional event logs to be stored in the data structure, as described above.

Process 500 may include additional implementations, such as any single implementation or any combination of implementations described below and/or in connection with one or more other processes described elsewhere herein.

In a first implementation, determining the rotation interval includes processing, using a machine learning model, the event rate and one or more previous event rates associated with the tenant to determine a predicted event rate, and determining the rotation interval based on the predicted event rate.

In a second implementation, alone or in combination with the first implementation, determining the rotation interval includes processing, using a univariate time series forecasting model, the event rate and one or more previous event rates associated with the tenant to determine a predicted event rate, and determining the rotation interval based on the predicted event rate.

In a third implementation, alone or in combination with one or more of the first and second implementations, determining the rotation interval includes determining, based on the event rate, a predicted event rate; identifying a representative capacity of a data structure; determining, based on the predicted event rate, a number of event logs to be received during a particular time interval; determining that the number of event logs to be received during the particular time interval is less than or equal to the representative capacity; and identifying the particular time interval as the rotation interval.

In a fourth implementation, alone or in combination with one or more of the first through third implementations, determining the rotation interval includes determining, based on the event rate, a predicted event rate; identifying a representative capacity of a data structure; determining, based on the predicted event rate, a number of event logs to be received during a particular time interval; determining that the number of event logs to be received during the particular time interval is greater than the representative capacity; and causing the rotation interval to be greater than the particular time interval.

In a fifth implementation, alone or in combination with one or more of the first through fourth implementations, a name of the data structure identifies at least one of the tenant, the time window, or a category of event logs to be stored in the data structure.

In a sixth implementation, alone or in combination with one or more of the first through fifth implementations, process 500 includes obtaining an event log search request; determining, based on the event log search request, a span of time associated with the event log search request; searching, based on the span of time associated with the event log search request, another data structure to identify a set of data structures, wherein each data structure, of the set of data structures, stores event logs associated with the tenant that were obtained during a particular time window that is at least partially coextensive with the span of time associated with the event log search request; performing, based on the event log search request, one or more data structure queries on the set of data structures to identify event log search information; and providing the event log search information.

In a seventh implementation, alone or in combination with one or more of the first through sixth implementations, the other data structure is a binary search tree.

In an eighth implementation, alone or in combination with one or more of the first through seventh implementations, process 500 includes obtaining a remaining storage capacity request; determining, based on the remaining storage capacity request, an amount of available storage for the tenant; determining, based on the amount of the available storage for the tenant, a number of event logs that can be stored in the available storage for the tenant; determining, based on the number of event logs that can be stored in the available storage for the tenant and the event rate associated with the tenant, a remaining storage capacity for the tenant represented in an amount of time; and providing the remaining storage capacity for the tenant represented in the amount of time.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:
   one or more memories; and
   one or more processors to:
      obtain one or more event logs associated with a tenant of the system;

determine, based on the one or more event logs, an event rate associated with the tenant;
determine, based on the event rate, a rotation interval;
cause, based on the rotation interval, a data structure to be generated for storing event logs associated with the tenant that are obtained during a time window;
obtain, within the time window, one or more additional event logs associated with the tenant; and
cause, based on obtaining the one or more additional event logs within the time window, the one or more additional event logs to be stored in the data structure.

2. The system of claim 1, wherein the one or more processors, to determine the rotation interval, are to:
process, using a machine learning model, the event rate and one or more previous event rates associated with the tenant to determine a predicted event rate; and
determine the rotation interval based on the predicted event rate.

3. The system of claim 1, wherein the one or more processors, to determine the rotation interval, are to:
process, using a univariate time series forecasting model, the event rate and one or more previous event rates associated with the tenant to determine a predicted event rate; and
determine the rotation interval based on the predicted event rate.

4. The system of claim 1, wherein the one or more processors, to determine the rotation interval, are to:
determine, based on the event rate, a predicted event rate;
identify a representative capacity of a data structure;
determine, based on the predicted event rate, a number of event logs to be received during a particular time interval;
determine that the number of event logs to be received during the particular time interval is less than or equal to the representative capacity; and
identify the particular time interval as the rotation interval.

5. The system of claim 1, wherein the one or more processors, to determine the rotation interval, are to:
determine, based on the event rate, a predicted event rate;
identify a representative capacity of a data structure;
determine, based on the predicted event rate, a number of event logs to be received during a particular time interval;
determine that the number of event logs to be received during the particular time interval is greater than the representative capacity; and
cause the rotation interval to be greater than the particular time interval.

6. The system of claim 1, wherein a name of the data structure identifies at least one of:
the tenant;
the time window; or
a category of event logs to be stored in the data structure.

7. The system of claim 1, wherein the one or more processors are further to:
obtain an event log search request;
determine, based on the event log search request, a span of time associated with the event log search request;
search, based on the span of time associated with the event log search request, another data structure to identify a set of data structures,
wherein each data structure, of the set of data structures, stores event logs associated with the tenant that were obtained during a particular time window that is at least partially coextensive with the span of time associated with the event log search request,
perform, based on the event log search request, one or more data structure queries on the set of data structures to identify event log search information; and
provide the event log search information.

8. The system of claim 7, wherein the other data structure is a binary search tree.

9. The system of claim 1, wherein the one or more processors are further to:
obtain a remaining storage capacity request;
determine, based on the remaining storage capacity request, an amount of available storage for the tenant;
determine, based on the amount of the available storage for the tenant, a number of event logs that can be stored in the available storage for the tenant;
determine, based on the number of event logs that can be stored in the available storage for the tenant and the event rate associated with the tenant, a remaining storage capacity for the tenant represented in an amount of time; and
provide the remaining storage capacity for the tenant represented in the amount of time.

10. A non-transitory computer-readable medium storing a set of instructions, the set of instructions comprising:
one or more instructions that, when executed by one or more processors of a system, cause the system to:
determine, based on one or more event logs associated with a tenant of the system, an event rate associated with the tenant;
determine, based on the event rate, a predicted event rate associated with the tenant;
determine, based on the predicted event rate, a rotation interval;
cause, based on the rotation interval, a data structure to be generated for storing event logs associated with the tenant that are obtained during a time window;
obtain, within the time window, one or more additional event logs associated with the tenant; and
cause, based on obtaining the one or more additional event logs within the time window, the one or more additional event logs to be stored in the data structure.

11. The non-transitory computer-readable medium of claim 10, wherein the one or more instructions, that cause the system to determine the predicted event rate, cause the system to:
process, using a machine learning model, the event rate to determine the predicted event rate.

12. The non-transitory computer-readable medium of claim 10, wherein the one or more instructions, that cause the system to determine the predicted event rate, cause the system to:
process, using a univariate time series forecasting model, the event rate to determine the predicted event rate.

13. The non-transitory computer-readable medium of claim 10, wherein the one or more instructions, that cause the system to determine the rotation interval, cause the system to:
determine, based on the predicted event rate, a number of event logs to be received during a particular time interval;
determine that the number of event logs to be received during the particular time interval is less than or equal to a representative capacity of a data structure; and
identify the particular time interval as the rotation interval.

14. The non-transitory computer-readable medium of claim 10, wherein the one or more instructions, that cause the system to determine the rotation interval, cause the system to:
  determine, based on the predicted event rate, a number of event logs to be received during a particular time interval;
  determine that the number of event logs to be received during the particular time interval is greater than a representative capacity of a data structure; and
  cause the rotation interval to be greater than the particular time interval.

15. The non-transitory computer-readable medium of claim 10, wherein the one or more instructions further cause the system to:
  obtain an event log search request;
  determine, based on the event log search request, a span of time associated with the event log search request;
  search, based on the span of time associated with the event log search request, another data structure to identify a set of data structures that store event logs associated with the tenant and that are associated with the span of time associated with the event log search request,
  perform, based on the event log search request, one or more data structure queries on the set of data structures to identify event log search information; and
  provide the event log search information.

16. The non-transitory computer-readable medium of claim 10, wherein the one or more instructions further cause the system to:
  obtain a remaining storage capacity request;
  determine, based on the remaining storage capacity request, a number of event logs that can be stored in available storage for the tenant;
  determine, based on the number of event logs that can be stored in the available storage for the tenant and the event rate associated with the tenant, a remaining storage capacity for the tenant represented in an amount of time; and
  provide the remaining storage capacity for the tenant represented in the amount of time.

17. A method, comprising:
  determining, by a system and based on one or more event logs associated with a tenant of the system, an event rate associated with the tenant;
  determining, by the system and based on the event rate, a rotation interval;
  causing, by the system and based on the rotation interval, a data structure to be generated for storing event logs associated with the tenant that are obtained during a time window; and
  causing, by the system, one or more additional event logs that are obtained within the time window to be stored in the data structure.

18. The method of claim 17, wherein determining the rotation interval comprises:
  processing, using a machine learning model, the event rate to determine the rotation interval.

19. The method of claim 17, wherein determining the rotation interval comprises:
  determining, based on the event rate, a number of event logs to be received during a particular time interval;
  determining that the number of event logs to be received during the particular time interval is less than or equal to a representative capacity of a data structure; and
  identifying the particular time interval as the rotation interval.

20. The method of claim 17, wherein determining the rotation interval comprises:
  determining, based on the event rate, a number of event logs to be received during a particular time interval;
  determining that the number of event logs to be received during the particular time interval is greater than a representative capacity of a data structure; and
  causing the rotation interval to be greater than the particular time interval.

* * * * *